United States Patent [19]

Matthews et al.

[11] Patent Number: 4,804,551
[45] Date of Patent: Feb. 14, 1989

[54] MANUFACTURE OF MEAT-BASED PRODUCTS

[75] Inventors: Bernard T. Matthews, Norwich; David J. Joll, Holt; Habeeb M. Ziauddin; David N. Wilson, both of Norwich, all of England

[73] Assignee: Bernard Matthews PLC, England

[21] Appl. No.: 45,517

[22] Filed: May 4, 1987

[30] Foreign Application Priority Data

Jun. 6, 1986 [GB] United Kingdom ............... 8613794

[51] Int. Cl.$^4$ ..................... A23L 1/317; A23L 4/06
[52] U.S. Cl. .................................. 426/518; 426/513; 426/645
[58] Field of Search ............... 426/641, 646, 645, 518, 426/513, 515

[56] References Cited

U.S. PATENT DOCUMENTS 3,030,214  4/1962  Miller ................................. 426/393
3,771,729  11/1973  Frable ................................. 241/23
3,780,191  12/1973  Langer et al. ....................... 426/442
4,098,095  7/1978  Roth ................................... 426/524
4,192,899  3/1980  Roth ................................... 426/143
4,337,627  7/1982  Roth ................................... 426/524
4,349,575  9/1982  Roth ................................... 426/524

FOREIGN PATENT DOCUMENTS 3107576  8/1982  Fed. Rep. of Germany .
360915  5/1906  France .
2469956  5/1981  France .
1340312  12/1973  United Kingdom .
1409705  10/1975  United Kingdom .
2064306  5/1981  United Kingdom .

*Primary Examiner*—Steven Weinstein
*Assistant Examiner*—Helen Pratt
*Attorney, Agent, or Firm*—Parkhurst, Oliff & Berridge

[57] ABSTRACT

A process of producing an evenly cooled comminute of meat particles ready for forming comprises forming a primary comminute from fresh meat, cooling the particles of the primary comminute into a coherent strip on a moving refrigerated surface and subjecting the strip to a secondary comminution with a reduction in particle size and a temperature equalization.

5 Claims, 2 Drawing Sheets

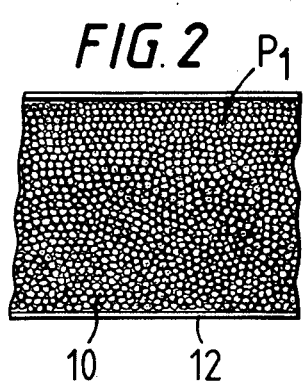
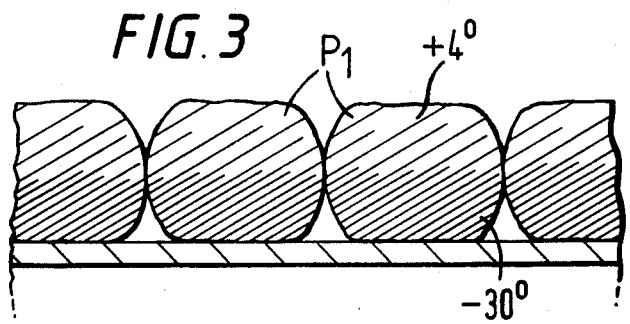

MANUFACTURE OF MEAT-BASED PRODUCTS

DESCRIPTION

This invention is concerned with the manufacture of meat-based products formed by compaction, for example moulding or extrusion, of comminuted meat, possibly mixed with other edible material.

It is important in the manufacture of such products to have the comminuted meat at a suitably cold temperature for forming. A mass of comminuted meat starts to freeze solid at a temperature in the region of $-2°$ C. The mass is frozen solid at or around $-8°$ C. so at temperatures between $-2°$ and $-8°$ C., the freezing process is taking place and the latent heat of freezing is being extracted from the system. Thus the meat mass is relatively stable, so far as temperature is concerned, in this zone and, moreover, latent heat phenomena assist in the effective compaction. For convenience we will refer to a meat mass in this temperature range, the desired for compaction, as being in the "latent zone" and an objective of an effective process is to produce a meat mass evenly cooled to this latent zone.

Current practice in the meat industry in the production of granular comminutes for forming is to cause or allow meat initially frozen solid and in large pieces to cool, or "temper" to the temperature required for forming. The suitably tempered meat is then comminuted into a cool mass. This tempering requires considerable skill and is liable to inconsistencies in forming as it is difficult to achieve a uniform temperature in the comminute. Lack of uniformity of temperature gives rise to variation in texture and density in the compacted product.

In accordance with the present invention meat particles, a primary comminute, are discharged as a thin layer onto a moving refrigerated surface. The layer is preferably approximately one particle thick so that, at least so far as is practically possible, each and every particle is contacted by the refrigerated surface and thereby substantially every, paricle is brought to a similar calorific value. The thin layer travelling along the surface is converted by the freezing process to a coherent strip of compacted particles and this strip is subject to a further comminution operation to reduce particle size and to produce an evenly cooled mass of meat particles ready for forming.

The strip removed from the refrigerated surface is made up of particles each of substantially the same calorific value, there being a temperature gradient within each particle from the inner surface which contacts the refrigerated surface to the outer surface. During the further comminution the particles are reduced in size and mixed and the evenly cooled mass is achieved.

This evenly cooled mass of comminuted meat ready for forming has a temperature within the desired latent zone so is reasonably temperature-stable and may be taken immediately for compaction or stored in a chilled room.

The freezing to the thin layer may conveniently be carried out on the surface of a drum freezer. In a drum freezer a large diameter drum with a refrigerated surface rotates slowly about a horizontal axis. Material to be frozen is fed onto the upper part of the drum, sticks to the drum by surface freezing and is transported about an arc by movement of the drum. When frozen the product is detached as a coherent pliable strip. Preferably the desired layer thickness is achieved by feeding the primary comminute from a suitable manifold into a nip between the freezer drum and a contra-rotating roller.

U.S. Pat. No. 4,098,095 discloses a refrigeration apparatus based on a drum freezer. A viscous protein-based and non-granular paste is frozen on the surface of the roller into a strip, which strip may be chopped for transporting or unspecified further processes. U.S. Pat. No. 4,192,899 discloses a drum freezer used for freezing ground meat. Meat patties are stamped out of the frozen strip emerging from the drum.

The characteristic feature of the present invention is the use of the drum to freeze each particle of a primary comminute to an even calorific value, substantially immediately followed by a second comminution, which reduces the particles to the desired size and equalises the temperature in the mass of particles.

The invention will now be described by way of example and with reference to the accompanying schematic drawings wherein:

FIG. 2 is a plan view along the line B of a strip of frozen particles emerging from the drum; and FIG. 3 is a cross-section, partly diagrammatic, on the line III—III showing a section of the strip of particles on the periphery of the drum.

Figure 1:
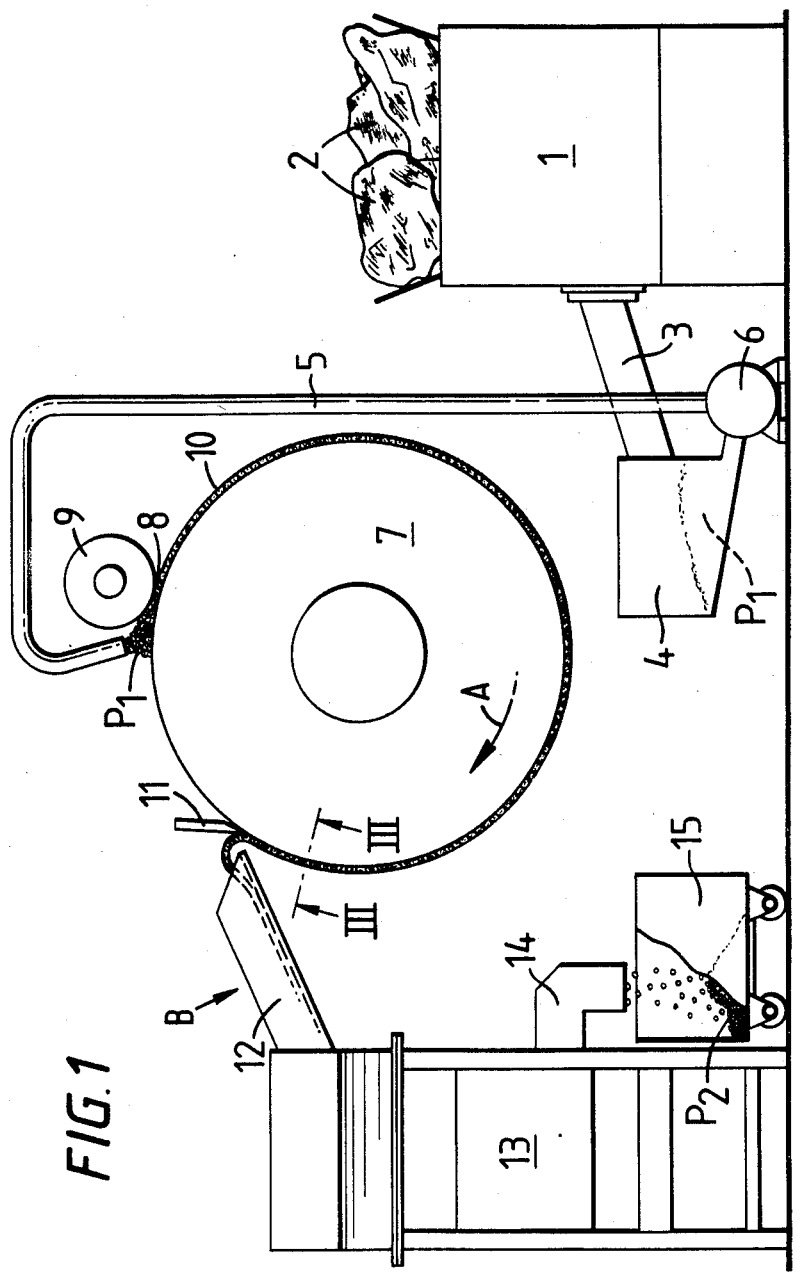
FIG. 1 is a diagram of apparatus putting the invention into effect.

Referring initially to FIG. 1 of the drawings a primary comminution device is indicated at 1. Large pieces of fresh meat 2 are the primary input to the process. "Fresh meat" as the term is understood in the meat industry arrives from specialist suppliers at approximately $0°$ C. (All temperatures specified will be mean temperatures unless otherwise stated). During handling this temperature rises somewhat. The large pieces of fresh meat are subjected to a primary comminution in device 1 to produce relatively large large particles $P_1$ having a diameter in the embodiment being described approximately 2 cm. This primary comminution can, for example, be achieved by driving the large pieces through a multi-apertured plate. Any appropriate known comminution process can, however, be used. The particles $P_1$ pass through pipe 3 into hopper 4 and from thence are driven upwardly through pipe 5 by pump 6 to be discharged downwardly into the surface of the drum freezer. The particles after this initial handling and primary comminution and other processing have a temperature in the region of $+8°$ to $+10°$ C.

The pipe 5 discharges downwardly (in a realized embodiment probably as a two-nozzle manifold) into the nip 8 between slowly rotating drum freezer 7 and a contra-rotating roller 9. The drum freezer, of proprietary construction, has a diameter of the order of 3 meters and is approximately 1 meter in axial length. The drum freezer contains a freezing annulus producing a surface temperature of the order of $-30°$ C. The nip 8 is so dimensioned as to achieve, so far as it is possible a layer 10 of primary comminute on the drum of the order of one particle thick. FIG. 3 illustrates this condition, idealised, with the particles slightly flattened by the nip. The primary particles are fed onto the freezer drum through the nip as a fluid and the layer 10 remains stuck by freezing on the cold drum surface for a period determined by the speed of rotation and the angular position of the stripping blade 11. The speed of rotation in the sense of arrow A is approximately one third of a revolution per minute and the layer 10 adhering to the surface of the roller goes round approximately 300° to the stripping blade 11 which contacts the surface of the roller to divert and remove the layer from the drum 7 onto a downwardly inclined chute 12.

During its period of contact with the drum the physical form of the layer 10 is changed from the fluid to a frozen and partially compacted strip with the physical form generally similar to that of cardboard. That is to say the strip is stiff enough to maintain coherence and integrity but sufficiently pliable to be despatched and discharged into the chute without fracturing. FIG. 2 is a plan and partially diagrammatic view of the strip 10 in the chute.

Referring to FIG. 3 the idealised representation of the particles shows them cohered together at a location just before separation from the drum. At this stage each particle has its inner peripheral region in contact with the surface of the drum at approximately −30° C., being the drum surface temperature. The outer periphery has the temperature decreased much less say to +4° C. Thus each and every particle P has a substantially even calorific value and a temperature gradient from inside to out of the order of 34° C. The strip 10 of particles thus cooled descends the short chute 12 under the drive of the drum straight into a secondary comminuting device 13 which reduces the particle size by half to approximately 1 cm. During the blending which inevitably accompanies this comminution the temperature of the overall mass of particles is equalised so that a consistent even mean temperature of the order of −4° C. is achieved. This is within the desired latent zone. The secondary comminution device may be of known type corresponding to the particle size reduction to be achieved. A suitable device is based on a screw mincer preceded by a rotating vaned shaft.

The reduced and finally comminuted particles $P_2$ are discharged from the secondary comminuter 13 for further processing. As illustrated the particles are discharged through outlet pipe 14 into a trolley 15 which may be taken away for more or less immediate use, not more than 30 minutes dwell, into a forming device of a known type; patties and substitute meat cuts may be shaped in a known manner. Alternatively the trolley can be taken to a chill room held at −4° C. where it remains in its stable and evenly frozen state. A further possibility is to integrate the discharge nozzle 14 by means of suitable piping with a forming device so that a totally integrated process of dealing with large pieces through primary and secondary comminutes onto a forming device is achieved.

We claim:

1. A process for the production of an evenly cooled comminuted mass of granular meat ready for forming which comprises the steps of discharging as a thin layer a primary comminute of meat grains onto a moving refrigerated surface, thereby freezing said layer into a coherent strip comprising meat grains each having a similar calorific value, removing said strip from said surface and converting said strip by a secondary comminution operation with a reduction of grain size into an evenly cooled mass of granular meat.

2. The process of claim 1 wherein the layer on the refrigerated surface is of the order of one grain thick.

3. The process of claim 1 wherein the refrigerated surface is the surface of a drum freezer.

4. The process of claim 1 which includes the step of forming the primary comminute from large pieces of fresh meat and discharging through appropriate piping said primary comminute onto the moving surface.

5. The process of claim 4 wherein the primary comminute is discharged onto said surface through the nip between a rotating freezer drum and a contra-rolling roller.

* * * * *